United States Patent
Liu

(10) Patent No.: US 11,474,291 B2
(45) Date of Patent: Oct. 18, 2022

(54) OPTICAL COMPONENT, BACKLIGHT MODULE, ELECTRONIC EQUIPMENT, AND METHOD FOR MANUFACTURING OPTICAL COMPONENT

(71) Applicant: BEIJING XIAOMI MOBILE SOFTWARE CO., LTD., Beijing (CN)

(72) Inventor: Zhaonan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/060,522

(22) Filed: Oct. 1, 2020

(65) Prior Publication Data
US 2021/0373226 A1    Dec. 2, 2021

(30) Foreign Application Priority Data

May 29, 2020 (CN) .................... 202010477081.X

(51) Int. Cl.
*F21V 8/00* (2006.01)
*B29D 11/00* (2006.01)

(52) U.S. Cl.
CPC ...... *G02B 6/0053* (2013.01); *B29D 11/00663* (2013.01); *B29D 11/00673* (2013.01); *B29D 11/00865* (2013.01); *B29D 11/00875* (2013.01); *B29D 11/00903* (2013.01); *G02B 6/0013* (2013.01); *G02B 6/0033* (2013.01); *G02B 6/0051* (2013.01); *G02B 6/0055* (2013.01); *G02B 6/0065* (2013.01)

(58) Field of Classification Search
CPC .................. G02B 6/0013; G02B 6/0053
See application file for complete search history.

(56) References Cited

U.S. PATENT DOCUMENTS

| 5,788,356 A * | 8/1998 | Watai .................. G02B 6/0031 362/23.15 |
| 6,752,505 B2 * | 6/2004 | Parker ................. G02B 6/0036 362/627 |
| 6,808,281 B2 * | 10/2004 | Ho ...................... G02B 6/0013 362/225 |
| 6,974,241 B2 * | 12/2005 | Hara .................... G02B 6/0038 362/606 |

(Continued)

FOREIGN PATENT DOCUMENTS

| CN | 102095142 A | 6/2011 |
| CN | 202421530 U | 9/2012 |

(Continued)

OTHER PUBLICATIONS

Yan et al., "Edge-Lighting Light Guide Plate Based on Micro-Prism for Liquid Crystal Display", Sep. 2009, Journal of Display Technology, vol. 5, No. 9, pp. 355-357. Obtained from IEEE Xplore utilizing InnovationQ Plus (Year: 2009).*

(Continued)

*Primary Examiner* — Keith G. Delahoussaye
(74) *Attorney, Agent, or Firm* — Oblon, McClelland, Maier & Neustadt, L.L.P.

(57) ABSTRACT

An optical component includes a light guide board. The light guide board can include an incident surface, an underside, and an exit surface. The incident surface is connected to the underside and the exit surface, respectively. The underside is parallel to the exit surface. Further, the exit surface includes a prism structure for refracting light in the light guide board.

7 Claims, 16 Drawing Sheets

(56) References Cited

U.S. PATENT DOCUMENTS

| | | | | |
|---|---|---|---|---|
| 7,220,026 | B2* | 5/2007 | Ko | G02B 5/045 362/339 |
| 7,513,669 | B2* | 4/2009 | Chua | B82Y 20/00 313/501 |
| 7,690,831 | B2* | 4/2010 | Mori | G02B 6/0013 362/621 |
| 8,079,745 | B2* | 12/2011 | Chen | G02B 6/002 362/621 |
| 8,692,446 | B2* | 4/2014 | Zhang | B82Y 20/00 313/116 |
| 2002/0018341 | A1* | 2/2002 | Torihara | G02B 6/0053 362/601 |
| 2004/0234724 | A1* | 11/2004 | Kaminsky | G02B 5/045 428/141 |
| 2007/0201246 | A1* | 8/2007 | Yeo | G02B 6/0053 362/627 |
| 2008/0013323 | A1* | 1/2008 | Katsumoto | G02B 6/0053 362/311.06 |
| 2008/0225207 | A1* | 9/2008 | Kim | G02F 1/133606 349/95 |
| 2018/0039012 | A1 | 2/2018 | Shin et al. | |
| 2019/0302515 | A1* | 10/2019 | Tan | G02B 6/0036 |

FOREIGN PATENT DOCUMENTS

| | | |
|---|---|---|
| CN | 203849450 U | 9/2014 |
| CN | 104165330 A | 11/2014 |
| CN | 204925440 U | 12/2015 |
| CN | 105353445 A | 2/2016 |
| CN | 105511164 A | 4/2016 |
| CN | 109975917 A | 7/2019 |
| CN | 110308511 A | 10/2019 |
| EP | 2 237 081 A2 | 10/2010 |
| WO | WO 2007/094558 A1 | 8/2007 |
| WO | WO 2011/057457 A1 | 5/2011 |
| WO | WO 2011/102681 A2 | 8/2011 |

OTHER PUBLICATIONS

Extended European Search Report dated May 7, 2021 in European Patent Application No. 21151107.6 citing documents AA and AN-AV therein, 9 pages.

Combined Chinese Office Action and Search Report dated Nov. 30, 2021 in Patent Application No. 202010477081.X (with English language translation), citing documents AO-AR therein, 15 pages.

* cited by examiner

S100, an optical board having a prism structure on an exit surface is formed by injection molding. The optical board and light guiding network dots on an underside of the optical board form a light guide board. The underside and the exit surface of the optical board are opposite surfaces of the optical board

FIG. 13

OPTICAL COMPONENT, BACKLIGHT MODULE, ELECTRONIC EQUIPMENT, AND METHOD FOR MANUFACTURING OPTICAL COMPONENT

CROSS-REFERENCE TO RELATED APPLICATIONS

This application is based on, and claims benefit of priority to, Chinese Application No. 202010477081.X filed on May 29, 2020. Disclosure of this Applications is hereby incorporated by reference in its entirety.

BACKGROUND

In the related art, a display component of electronic equipment mainly may include a display and a backlight module. As shown in FIG. 1, a backlight module generally may include a backlight source and optical films, such as a reflective sheet, a light guide board, a prism sheet, a diffuser sheet, and the like. However, due to poor stability among optical films in a backlight module, the optical films can change their locations with respect to each other during transportation, assembly, and use. As a result, this can cause low yield of the backlight module, which can impact a display performance of electronic equipment.

SUMMARY

The subject disclosure relates to the field of display. Exemplary embodiments herein provide an optical component, a backlight module, electronic equipment, and a method for manufacturing an optical component.

According to a first aspect, an optical component includes a light guide board. The light guide board includes an incident surface, an underside, and an exit surface. The incident surface is perpendicular to the underside and the exit surface, respectively. The underside is parallel to the exit surface. The exit surface includes a prism structure for refracting light in the light guide board.

According to a second aspect, a backlight module can include the optical component according to the first aspect, and a backlight source deployed parallel to the incident surface of the optical component.

According to a third aspect, electronic equipment can include the backlight module according to the second aspect, a display module located above the backlight module, and a housing provided with an accommodating space for accommodating the backlight module and the display module.

According to a fourth aspect, a method for manufacturing an optical component can include forming, by injection molding, an optical board having a prism structure on an exit surface. The optical board and light guiding network dots on an underside of the optical board form a light guide board. The underside and the exit surface are opposite surfaces of the optical board.

The general description and detailed description below are but exemplary and explanatory, and do not limit the subject disclosure.

BRIEF DESCRIPTION OF THE DRAWINGS

Drawings here are incorporated in and constitute part of the subject disclosure, illustrate exemplary embodiments according to the subject disclosure, and together with the subject disclosure, serve to explain the principle of the subject disclosure.

FIG. 13 is a diagram of a method for manufacturing an optical component according to an exemplary embodiment.

DETAILED DESCRIPTION

Figure 1:
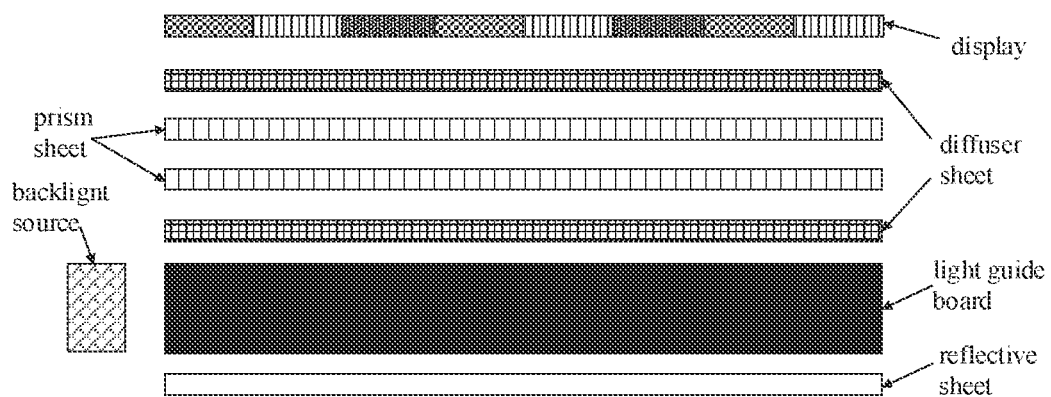
FIG. 1 is a diagram of a display component in related art.

Exemplary embodiments (examples of which are illustrated in the accompanying drawings) are elaborated below. The following description may refer to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device/equipment/terminal) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details, alternatively, another method, component, device, option, and the like, may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), and the like. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, and the like.

Figure 2:
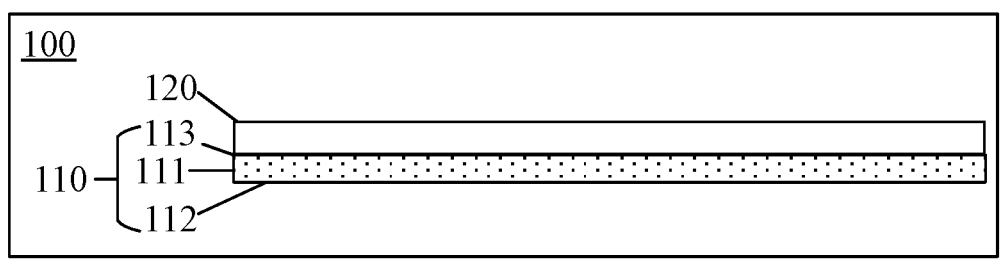
FIG. 2 is a diagram of an optical component according to an exemplary embodiment.

FIG. 2 is a diagram of an optical component 100 according to an exemplary embodiment. Referring to FIG. 2, the optical component 100 includes a light guide board 110.

The light guide board 110 includes an incident surface 111, an underside 112, and an exit surface 113. The incident surface 111 is connected to the underside 112 and the exit surface 113, respectively. The underside 112 is parallel to the exit surface 113. The exit surface 113 includes a prism structure 120 for refracting light in the light guide board 110.

Referring to FIG. 2, an edge of the exit surface 113 in the light guide hoard 110 may be connected to an edge of the underside 112 through the incident surface 111. That is, the incident surface 111 may be a side surface of the light guide hoard 110. The optical component 100 may be used in a backlight module where light enters from the side.

Figure 3A:
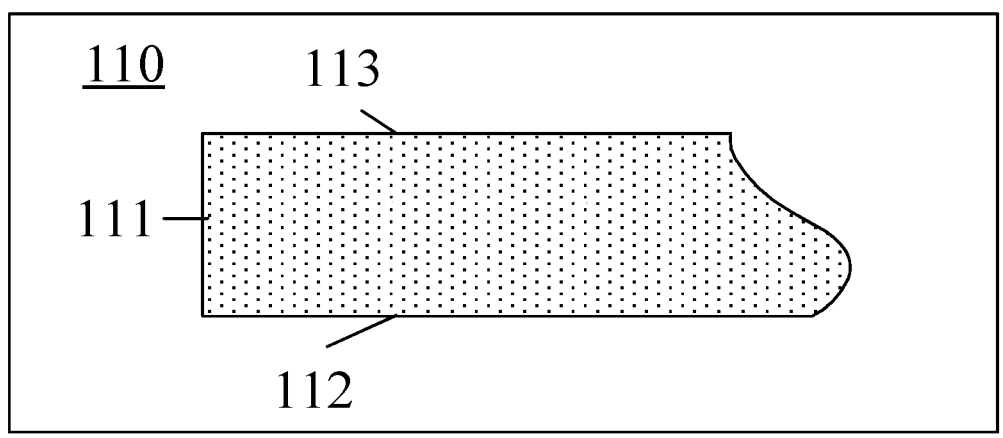
FIG. 3A to FIG. 3C are diagram of parts of a light guide board according to an exemplary embodiment.
Figure 3B:
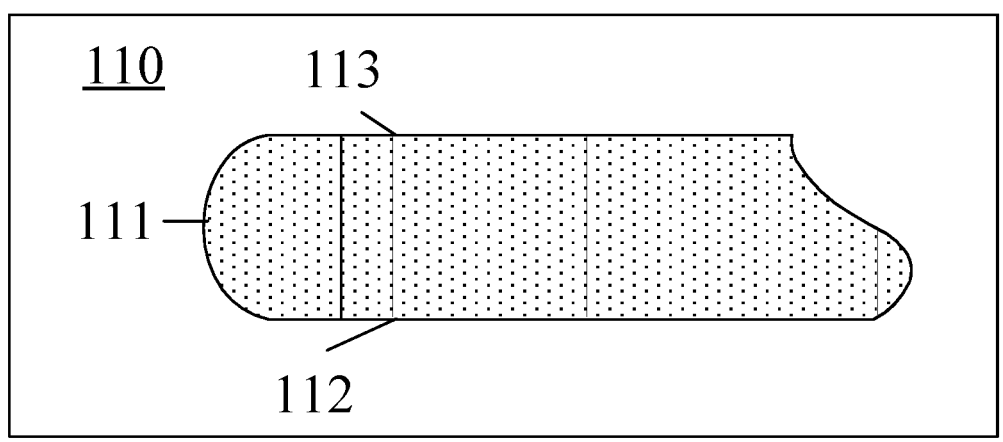
Figure 3C:
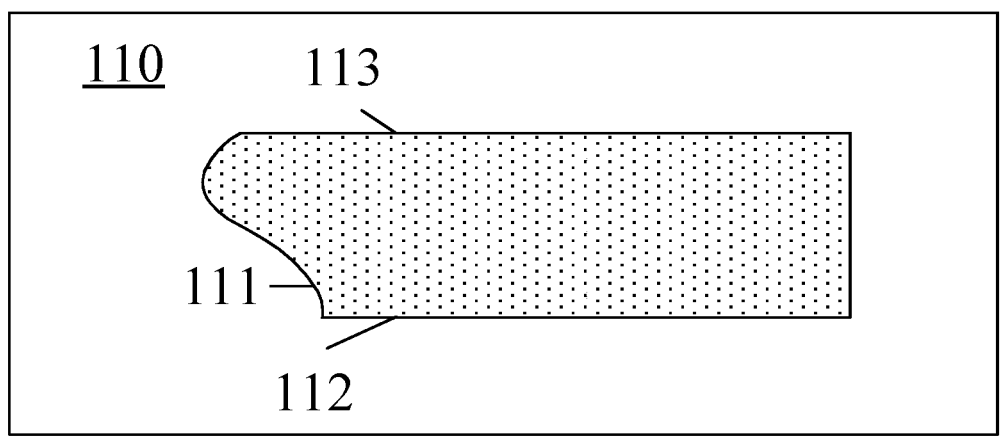

Exemplarily, the incident surface 111 may include a flat surface or a curved surface. Referring to FIG. 3A, when the incident surface 111 is a flat surface, the incident surface 111 may be perpendicular to both the underside 112 and the exit surface 113. Referring to FIG. 3B, when the incident surface 111 includes a curved surface, the incident surface 111 may form a convex curved surface. Alternatively, referring to FIG. 3C, the incident surface 111 may further include a concave curved surface that is concave toward the inside of the light guide board 110.

Exemplarily, the prism structure 120, for example, as shown in FIG. 2, may include a prism unit having a cross section of a curved contour (not shown) or of triangular contour, for example, as shown in FIGS. 5-9. The prism structure 120 and the light guide board 110 may be formed as one piece by injection molding. In this case, even though the prism structure 120 and the light guide board 110 are of an integral structure, the prism structure 120 and the light guide board 110 remain two parts playing different roles.

The light guide board 110 may serve to convert light provided by a point light source or a line light source into light of a surface light source, softening light emitted by display equipment. By virtue of its shape, the prism structure 120 may converge light incident from the exit surface 113 of the light guide board, increasing brightness of light emitted from the prism structure into the environment.

Understandably, there may not be a clear interface between the light guide board 110 and the prism structure 120 formed simultaneously as one piece by injection molding. In this case, a flat surface in the optical component 100 parallel to the underside 112 and connected to an edge of the incident surface 111 may be deemed as the exit surface 113 of the light guide board 110.

It should be noted that since the prism structure 120 and the light guide board 110 are formed as one piece by injection molding and are securely connected to each other, there the prism structure 120 and the light guide board 110 will not move with respect to each other.

A refractive index of the prism structure 120 may be no greater than a refractive index of the light guide board 110. A refractive index of the environment in contact with the prism structure 120 may be less than the refractive index of the prism structure 120. Light in the light guide board may propagate as follows. Light from the exit surface 113 of the light guide board may enter the prism structure 120, refracted by the prism structure 120, and then enter the environment in contact with the prism structure 120.

When light propagates from the prism structure 120 to the environment, even if total internal reflection occurs, a direction in which reflected light propagates may change on another surface of the prism structure. Accordingly, light may eventually propagate into the environment. The light may include visible light.

Since the refractive index of the environment in contact with the prism structure 120 is less than the refractive index of the prism structure 120, referring to FIG. 3, after light from the exit surface 113 of the light guide board 110 enters the prism structure 120, the prism structure 120 may change the direction in which light emitted from the optical component 100 propagates by refracting light emitted from the exit surface 113 of the light guide board 110. Accordingly, light emitted from the optical component 100 may be converged in a direction perpendicular to the exit surface of the light guide board, thereby improving brightness of light emitted from the optical component.

Figure 4:
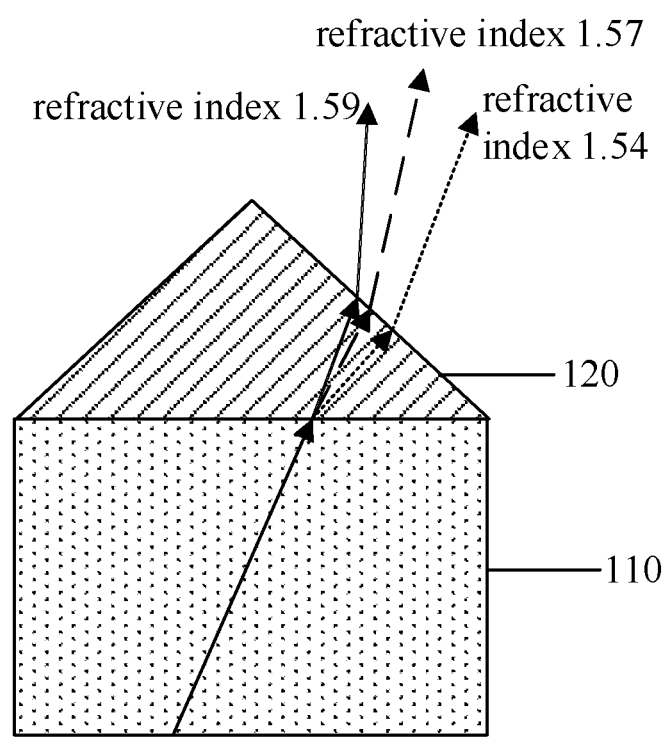
FIG. 4 is a diagram of part of an optical component according to an exemplary embodiment.

Exemplarily, the refractive index of the prism structure 120 may be 1.54, 1.57, 1.59, etc. Referring to FIG. 4, when the refractive index of the prism structure 120 increases, a ratio of the refractive index of the environment contacting the prism structure 120 to the refractive index of the prism structure 120 may decrease. An angle formed by light refracted from the prism structure to the environment with a direction perpendicular to the underside 112 of the light guide board may decrease. That is, the prism structure 120 may converge light to a greater extent. Therefore, a prism structure may be made of material of a greater refractive index to converge light better.

In order to reduce the probability of total internal reflection in propagation of light from the prism structure 120 to the environment, the value of the refractive index of the prism structure 120 may not be overly high.

With embodiments herein, a prism structure playing a role of a prism sheet is integrated onto an exit surface of a light guide board, forming a one-piece optical component serving as both a light guide board and a prism sheet. Compared to an optical module formed by assembling a separate prism sheet and a separate light guide board, with an optical component herein, first, tightness of connection between the prism structure and the light guide board is improved, and displacement between the prism sheet and the light guide board is reduced, thereby reducing wear and tear on the prism structure and the light guide board caused by the displacement, avoiding an issue such as degradation of display performance caused by wear and tear on the optical component.

Secondly, with an optical component herein that integrates a prism structure and a light guide board, the prism structure is borne directly on the light guide board, requiring no additional substrate to be formed in the prism sheet for bearing prisms, reducing a gap between the prism sheet and the light guide board, thereby reducing a thickness required for configuring display equipment herein, implementing lighter and thinner display equipment. Further, by integrating the prism sheet and the light guide board into a one-piece optical component, a number of process steps for assembling display equipment is reduced, improving productivity.

The prism structure 120 and the light guide board 110 may form a joined structure. Exemplarily, the light guide board 110 may serve as a substrate for bearing the prism structure 120. The prism structure may be formed on the exit surface 113 of the light guide board 110 by injection molding. In this case, the prism structure 120 and the light guide board 110 may form a joined structure, with the prism structure 120 and the light guide board 110 still playing different roles.

Figure 5:
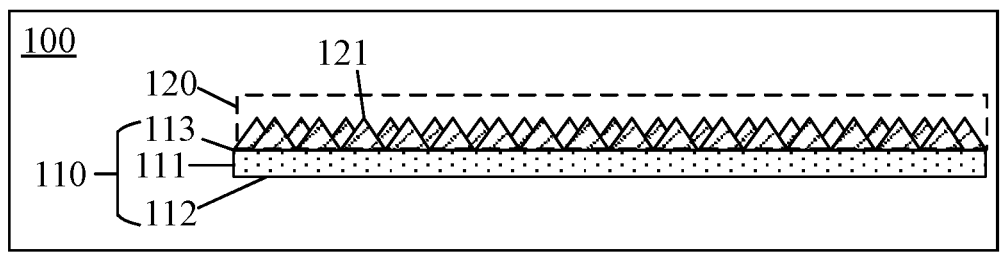
FIG. 5 is a diagram of an optical component according to an exemplary embodiment.

Compared to a prism sheet and a light guide board separate from each other, with an optical component herein, a prism structure 120 and a light guide board 110 form a joined structure, restraining displacement between the prism structure 120 and the light guide board 110, thereby reducing wear and tear on the prism structure and the light guide board caused by the displacement, avoiding an issue such as degradation of display performance caused by wear and tear on the optical component. A solution herein is easily compatible with prior art. Referring to FIG. 5, the prism structure 120 may include a prism array composed of multiple triangular prism units 121. Exemplarily, a triangular prism unit 121 may include a prism of a triangular prism or of a triangular pyramid.

In the prism array, two neighboring columns may be parallel to each other, and two neighboring rows may be parallel to each other. A column direction (the direction along which a column lies) may be perpendicular to a row direction (the direction along which a row lies). Furthermore, a flat surface formed by the column direction and the row direction may be parallel to the underside 112 of the light guide board 110. Understandably, the column direction may be a direction along which multiple triangular prism units in the column are deployed. The row direction may be a direction along which multiple triangular prism units in the row are deployed.

In the prism array, multiple triangular prism units 121 may be deployed in parallel along a direction parallel to the incident surface 111, forming a column in the prism array. That is, the column direction in the prism array may be a direction parallel to the incident surface 111.

In the prism array, multiple triangular prism units 121 may be deployed in parallel along a direction perpendicular to the incident surface 111, forming a row in the prism array. That is, the row direction in the prism array may be a direction perpendicular to the incident surface 111.

Exemplarily, two neighboring rows of triangular prism units 121 in the prism array may zigzag along a column direction.

Figure 6:
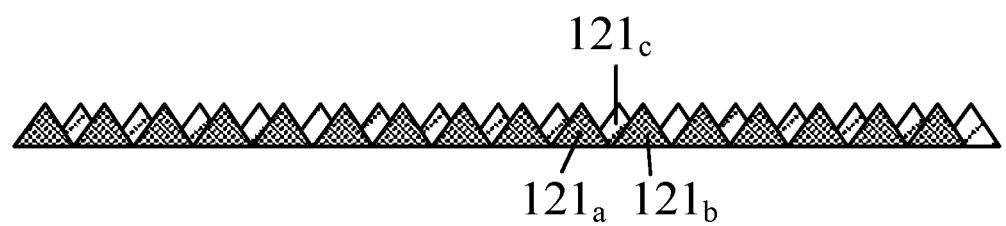
FIG. 6 is a diagram of part of a prism structure according to an exemplary embodiment.

Referring to FIG. 6, in the prism array, a kth triangular prism unit 121$_a$ in an nth row and a (k+1)th triangular prism unit 121$_b$ in the nth row may be spaced by a first gap. A line connecting a kth triangular prism unit 121 in an (n+1)th row and a location of the first gap may be parallel to the column direction of the prism array. The n and the k may be natural numbers. At least part of the kth triangular prism unit 121 in the (n+1)th row may be exposed through the first gap along the column direction.

As shown in FIG. 6, triangular prism units in the nth row and triangular prism unit in the (n+1)th row may be distinguished by being filled with different patterns. Understandably, triangular prism unit in the nth row and triangular prism unit in the (n+1)th row may have the same structure.

Exemplarily, two neighboring columns of triangular prism units 121 in the prism array may zigzag along a row direction.

In the prism array, a kth triangular prism unit in an nth column and a (k+1)th triangular prism unit in the nth column may be spaced by a second gap. A line connecting a kth triangular prism unit in an (n+1)th column and a location of the second gap may be parallel to the row direction of the prism array.

With embodiments herein, a prism structure 120 including a prism array is formed. A mode of deploying triangular prism units in the prism array is set, implementing the function of two layers of prism sheets in related art with one prism array. A structure thereof is simplified compared to a backlight module including two layers of prism sheets in related art, reducing a thickness of the optical component.

Figure 7:
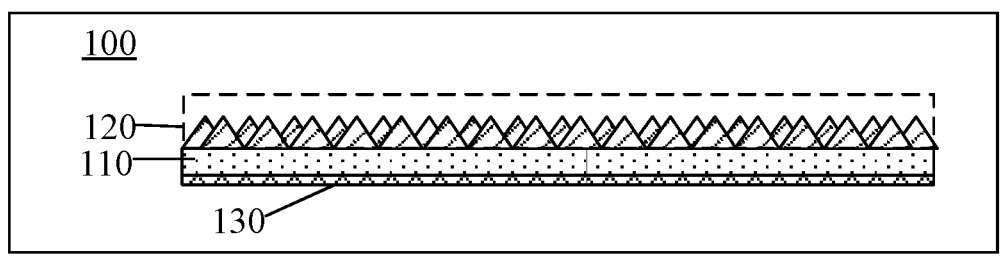
FIG. 7 is a diagram of an optical component according to an exemplary embodiment.

Referring to FIG. 7, the underside 112 may include a reflective coating 130 for reflecting light incident on the underside 112 of the light guide board 110.

When light is incident on the underside 112 of the light guide board 110, the reflective coating 130 may serve to reflect light incident on the underside 112. Reflected light may continue to propagate in the light guide board 110, reducing light leakage. Exemplarily, the light guide board 110 may be used as a bearer of the reflective coating 130. The reflective coating 130 may be formed on the underside of the light guide board 110 by spraying reflective material on the underside 112 of the light guide board 110.

The reflective material may include any material capable of reflecting light, such as metallic silver, metallic aluminum, and the like. Understandably, to reduce absorption of light by the reflective material and improve reflectivity of the reflective coating in reflecting light in the light guide board, a silver or white material, such as an alloy of silver and titanium, titanium dioxide, etc., may be used as the reflective material.

It should be understood that the light guide board 110 as the bearer of the reflective coating 130 may be securely connected to the reflective coating 130. The light guide board 110 and the reflective coating 130 may not move with respect to each other.

With embodiments herein, a reflective coating is integrated onto an underside of an optical component, forming a one-piece optical component that integrates a light guide board, a prism sheet, and a reflective sheet. Compared to an optical module formed by assembling a prism sheet, a reflective sheet, and a light guide board separate from each other, with an optical component herein, tightness of connection between the reflective coating and the light guide board is improved, thereby reducing wear and tear on the reflective coating and the light guide board caused by displacement, avoiding an issue such as degradation of display performance caused by wear and tear on the optical component.

Secondly, with an optical component herein that integrates a prism structure, a reflective coating, and a light guide board, the reflective coating is borne directly on the light guide board, requiring no additional substrate to be formed in the reflective sheet for bearing reflective material, reducing a gap between the reflective coating and the light guide board, thereby reducing a thickness required for configuring display equipment herein, implementing lighter and thinner display equipment.

Furthermore, by integrating the reflective sheet and the light guide board into a one-piece optical component, a number of process steps for assembling display equipment is reduced, improving productivity.

Figure 8:
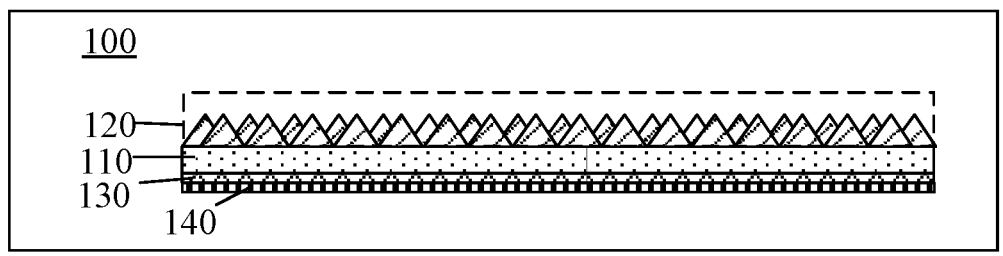
FIG. 8 is a diagram of an optical component according to an exemplary embodiment.

Referring to FIG. 8, the optical component 100 may further include a protective layer 140 located below the reflective coating 130. A surface area of the protective layer 140 may be greater than a surface area of the reflective coating 130. An edge of the protective layer 140 may be in contact with an edge of the underside 112 of the light guide board 110. The protective layer 140 may be attached to the reflective coating 130 from below, enclosing the reflective coating 130 in a space formed by the protective layer 140 and the underside 112 of the light guide board 110, reducing contact between the reflective coating 130 and the environment. The protective layer 140 may include polyurethane, polyethylene, and the like.

When the reflective coating 130 is exposed directly in the environment, there may be friction or collision between the reflective coating 130 and an object in the environment. Consequently, at least part of the reflective coating 130 may get damaged. Alternatively, the reflective coating 130 may be a metal coating susceptible to being oxidized. Then, direct exposure to the environment may also damage the reflective coating 130 due to oxidation. A damaged reflective coating 130 may reflect light poorly, leading to uneven light emitted from the optical component 100 or light leakage, reducing yield of the optical component 100.

With embodiments herein, a protective layer 140 is formed below a reflective coating 130, reducing contact between the reflective coating 130 and the environment, lowering a probability of the reflective coating 130 being damaged, ensuring intactness of the reflective coating 130, thereby ensuring quality of the optical component 100.

Understandably, formation of a protective layer may increase a thickness of the optical component. Therefore, a thin protective layer may be used to reduce impact of the protective layer to the overall thickness of the optical component. The thickness of the protective layer may be 50 microns, 30 microns, or even less.

Exemplarily, to further reduce light leakage by the optical component, a protective layer may be formed using black material. For example, a black tape may be attached to the surface of the reflective coating as a protective layer.

Figure 9:
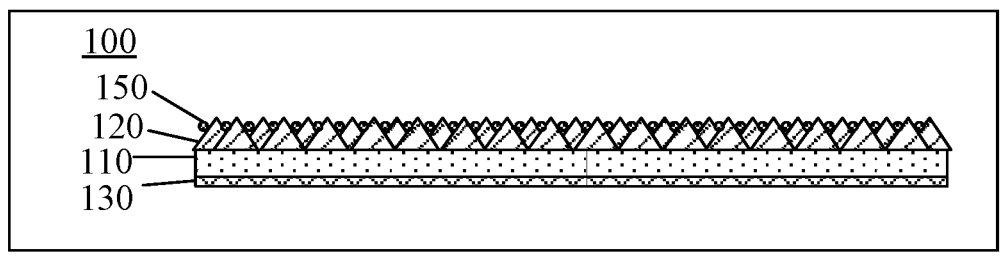
FIG. 9 is a diagram of an optical component according to an exemplary embodiment.

Referring to FIG. 9, the optical component 100 may further include a diffuser structure 150 for scattering light. The diffuser structure may be deployed atop the prism structure 120. The diffuser structure 150 may include scattering particles of different particle sizes.

The diffuser structure 150 may be of high transmittance, such as greater than 90%, reducing impact of the diffuser structure 150 to the amount of light emitted by the optical component 100. While passing through the scattering particles of different particle sizes in the diffuser structure 150, light will be scattered multiple times in the diffuser structure 150, softening light emitted from the prism structure 120.

With embodiments herein, a diffuser structure is integrated atop the prism structure, forming a one-piece optical component that integrates a light guide board, a prism sheet, and a diffuser sheet. First, compared to an optical module formed by assembling a prism sheet, a diffuser sheet, and a light guide board separate from each other, with an optical component herein, tightness of connection between the prism structure and the diffuser structure is improved, and displacement between the prism structure and the diffuser structure is reduced, thereby reducing wear and tear on the prism structure and the diffuser structure caused by the displacement, avoiding an issue such as degradation of display performance caused by wear and tear.

Secondly, with an optical component herein, the diffuser structure is borne directly on the prism structure, requiring no additional substrate to be formed in the diffuser sheet for bearing scattering particles, reducing a gap between the diffuser structure and the prism structure, thereby reducing a thickness required for configuring display equipment herein, implementing lighter and thinner display equipment. Further, by integrating a prism sheet, a diffuser sheet, and a light guide board into a one-piece optical component, a number of process steps for assembling display equipment is reduced, improving productivity.

Referring to FIG. 3B, the incident surface 111 may be a curved surface bulging toward an outside of the light guide board 110. Exemplarily, a cross section of the curved surface in a flat surface perpendicular to the underside and the exit surface of the light guide board may be semicircular.

When a vertical distance between the underside 112 of the light guide board 110 and the exit surface 113 remains the same, an incident area of a light guide board 110 with a curved surface as an incident surface 111 may be greater than an incident area of a light guide board 110 with a flat surface as an incident surface 111. Therefore, with locations of a light guide board and a backlight source fixed with respect to each other, compared to a light guide board 110 with a flat surface as an incident surface 111, a light guide board 110 with a curved surface as an incident surface 111 may acquire more light from the backlight source, improving display performance of electronic equipment using an optical component 100 herein.

Further, when the optical component 100 is applied to a backlight module, the curved surface may protrude to the backlight source in the backlight module. Therefore, the curved surface may form a structure similar to a convex lens at an end of the light guide board with the incident surface, to converge light emitted from the backlight source, further improving incident efficiency of the incident surface.

Compared to a light guide board with a flat surface as an incident surface, with embodiments herein, a curved surface bulging toward an outside of the light guide board 110 is used as the incident surface 111, increasing light entering the light guide board, improving incident efficiency of the light guide board, thereby ensuring display performance of electronic equipment using the optical component 100.

Furthermore, in related art, a flat surface perpendicular respectively to the underside and the exit surface of the light guide board is used as the incident surface. A section of the incident surface of the light guide board will form a sharp corner (such as a 90-degree right angle). The sharp corner renders it difficult to assemble and disassemble the light guide board. With embodiments herein, a curved surface connecting the underside 112 and the exit surface 113 is used as the incident surface 111, and a smooth curved surface replaces the sharp corner in related art, rendering it easier to assemble and disassemble the optical component 100.

Figure 10:
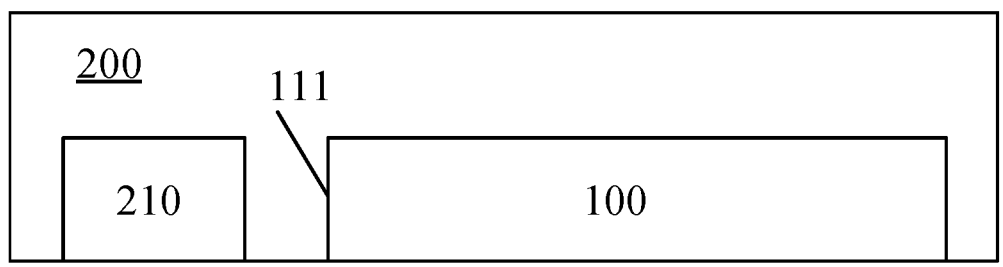
FIG. 10 is a block diagram of a backlight module according to an exemplary embodiment.

FIG. 10 is a diagram of a backlight module 200 according to an exemplary embodiment. Referring to FIG. 10, the backlight module 200 includes an optical component 100 herein and a backlight source.

The backlight source 210 is deployed parallel to the incident surface 111 of the optical component 100. The backlight source 210 may be deployed to face the incident surface of the optical component 100. The backlight source 210 may include an array of light emitting diodes, an array of organic light emitting diodes, and the like. The incident surface of the optical component 100 may be the incident surface 111 of the light guide board 110.

With embodiments herein, light emitted by a backlight source 210 is transmitted using an optical component 100, simplifying a structure of a backlight module 200, reducing a probability of displacement between a light guide board 110 and a prism structure 120 in the backlight module, and/or reducing a probability of displacement between a reflective coating 130 and the light guide board 110, and/or reducing a probability of displacement between a diffuser structure 150 and the prism structure 120, thereby improving quality of the backlight module 200.

In related art, a backlight module may include a reflective sheet, a light guide board, a prism sheet, and a diffuser sheet separate from each other. Pollutants, such as particles in the assembly environment may adhere in between contacting optical sheets, or in between a light guide board and a sheet, reducing quality of the backlight module. Therefore, in generally, the backlight module may have to be assembled in a vacuum environment.

An optical component 100 with an exit surface including a prism structure 120 may be used. The prism structure 120 and a light guide board 110 may be assembled while the prism structure 120 is being formed, requiring no additional assembly of the prism structure 120 and the light guide board 110.

An optical component 100 with an underside including a reflective coating 130 may be used. The reflective coating 130 and a light guide board 110 may be assembled while the reflective coating 130 is being formed, requiring no additional assembly of the reflective coating 130 and the light guide board 110.

An optical component 100 with a diffuser structure 150 deployed on a surface of a prism structure 120 may be used. The diffuser structure 150 and a light guide board 110 may be assembled while the diffuser structure 150 is being formed, requiring no additional assembly of the diffuser structure 150 and the light guide board 110.

Therefore, compared to a backlight module in related art, with embodiments herein, an optical component 100 is provided in a backlight module 200, simplifying a structure of the backlight module 200, simplifying assembly of the backlight module, lowering a requirement on an environment of assembling the backlight module as well as a cost, avoiding lowering of yield of the backlight module 200 due to friction between optical sheets, ensuring high yield of the backlight module.

Furthermore, an optical component 100 may include a prism structure 120, a reflective coating 130, and a diffuser structure 150. The optical component 100 may be deemed as of a one-piece structure. No structural back board has to be provided in a backlight module for securing a light guide board, a reflective sheet, a prism sheet, a diffuser sheet, etc. The one-piece optical component 100 may be deployed directly in the housing of electronic equipment for accommodating the backlight module, reducing the thickness of the backlight module, thereby reducing the overall thickness of the electronic equipment.

Figure 11:
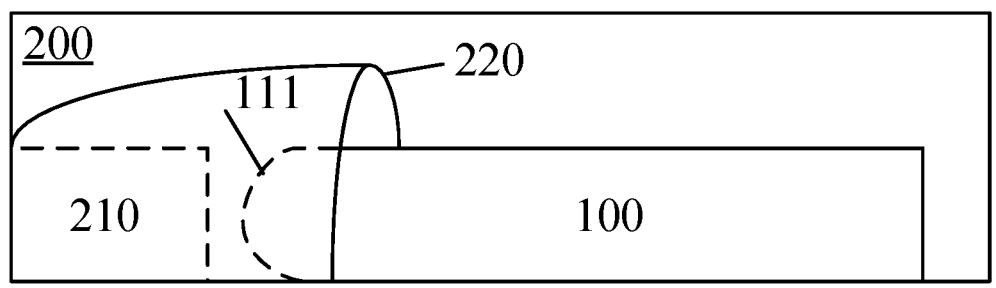
FIG. 11 is a diagram of a backlight module according to an exemplary embodiment.

Referring to FIG. 11, the backlight module 200 may further include a curved protective cover 220. The backlight source 210 may be secured inside the curved protective cover 220. At least the incident surface 111 of the light guide board 110 in the optical component 100 may be located in the curved protective cover 220.

Exemplarily, a side of the curved protective cover 220 facing the incident surface and the backlight source may be covered with a reflective layer. The reflective layer may serve to reflect incident light. Part of light emitted by the backlight source 210 will irradiate the curved protective cover 220. The curved protective cover 220 may reflect, through the reflective layer, light back into space where the incident surface 111 is located, improving utilization of light emitted by the backlight source.

A curved protective cover 220 may be formed. An end of an optical component 100 where an incident surface is located may be inserted into the curved protective cover 220, connecting the curved protective cover 220 to the optical component 100. Assembly is simple.

Figure 12:
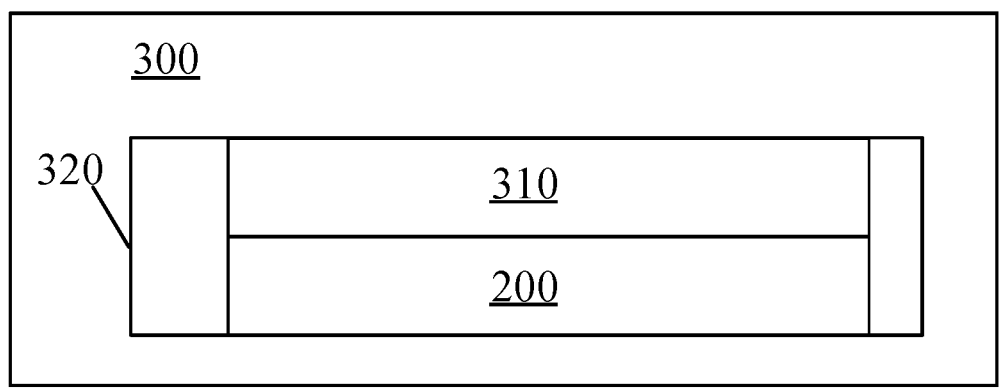
FIG. 12 is a block diagram of electronic equipment according to an exemplary embodiment.

FIG. 12 is a diagram of electronic equipment 300 according to an exemplary embodiment. Referring to FIG. 12, the electronic equipment includes a backlight module 200 herein, a display module, and a housing.

The display module 310 is located above the backlight module 200. The housing 320 is provided with an accommodating space for accommodating the backlight module 200 and the display module 310. The electronic equipment 300 may include a mobile phone, a notebook computer, a tablet computer, a smart bracelet, a television, and the like.

The display module 310 may include a liquid crystal display, a touch display, and the like. The backlight module 200 may serve to provide backlight to the display module 310.

The housing 320 may be made of rigid metallic material, such as metallic aluminum, metallic iron, alloy material, etc. The housing 320 may further be made of material such as plastics. The housing 320 may be provided with an opening. A display area of the display module 310 may be exposed through the opening. When the electronic equipment is used, the display area of the display module 310 may face a user through the opening.

As no structural back board has to be provided in a backlight module 200 for securing a light guide board, a reflective sheet, a prism sheet, a diffuser sheet, and the like, the backlight module may be deployed directly in the housing 320, reducing the overall thickness of the electronic equipment 300. Furthermore, few optical structures in the optical component 100 of the backlight module 200 can move with respect to each other, avoiding decrease of yield of the electronic equipment due to displacement between the optical structures, ensuring display performance of electronic equipment 300.

The electronic equipment 300 may further include a securing structure. The securing structure may be adapted to securing the optical component 100 inside the housing 320. Exemplarily, the securing structure may be made of material such as plastics, a metal, an alloy, and the like.

The securing structure may be bonded to the optical component 100 by a double-sided adhesive, a thermal set adhesive, a UV set adhesive, and the like. With embodiments herein, an optical component 100 is secured inside a housing 320 using a securing structure, reducing displacement between the optical component 100 and the housing 320, ensuring display performance of electronic equipment.

FIG. 13 is a flowchart of a method for manufacturing an optical component according to an exemplary embodiment. The method is used to manufacture an optical component 100 herein. Referring to FIG. 13, the method includes a step as follows.

In step S100, an optical board having a prism structure on an exit surface is formed by injection molding. The optical board and light guiding network dots on an underside of the optical board form a light guide board. The underside and the exit surface of the optical board are opposite surfaces of the optical board.

The optical board may be a substrate of the light guide board. The optical board may be a transparent board, in which light incident at an angle through an incident surface may be reflected totally. A refractive index of the optical board may be greater than the refractive index of the air. Here, the air may be deemed as the environment in contact with the optical board. Exemplarily, the optical board may be made of at least one of polycarbonate, polymethylmethacrylate, glass, etc.

When the light guide board is formed based on the optical board and the light guiding network dots, the incident surface of the optical board may be the incident surface of the light guide board, the exit surface of the optical board may be the exit surface of the light guide board, and the underside of the optical board may be the underside of the light guide board.

When light is incident on the light guiding network dots, the light guiding network dots will generate reflected light reflected toward different directions based on the incident light, undermining a condition for total internal reflection of light in the optical board. Accordingly, a surface light source may be formed based on light provided by a backlight source.

With embodiments herein, an optical board having a prism structure on an exit surface is formed by injection molding. The optical board and light guiding network dots on an underside of the optical board form a light guide board. A one-piece optical component that integrates both a light guide board and a prism sheet may be formed, improving tightness of connection between the prism structure and the optical board, reducing a probability of displacement between the prism structure and the optical board, thereby reducing decrease of yield due to friction between the prism structure and the optical board, ensuring display performance of electronic equipment provided with the optical component herein.

The method may further include a step as follows. After the optical board is formed, the light guiding network dots may be formed on the underside of the optical board. Exemplarily, light guiding network dots may be formed on the underside of the optical board by UV screen printing.

With embodiments herein, after an optical board is formed, light guiding network dots are formed on the underside of the optical board, which process is simple, and easily compatible with related art.

The method may further include a step as follows. While the optical board having the prism structure on the exit surface is being formed by injection molding, the light guiding network dots may be formed on the underside of the optical board by injection molding. With embodiments herein, a one-piece light guide board is formed by an injection molding process. A prism structure playing a role of a prism sheet is integrated onto an exit surface of the light guide board. No additional prism sheet has to be installed when the optical component is used in a backlight module or electronic equipment, simplifying a structure and a process of assembly of the backlight module or the electronic equipment.

The method may further include a step as follow. A diffuser structure for scattering light may be formed by spattering an upper surface of the prism structure with scattering particles of different particle sizes. Exemplarily, an upper surface of a prism structure may be spattered with scattering particles of different particle sizes by haze spattering. With embodiments herein, by spattering an upper surface of a prism structure with scattering particles of different particle sizes, a diffuser structure may be integrated atop the prism structure, forming a one-piece optical component that integrates a light guide board, a prism sheet, and a diffuser sheet, improving tightness of connection between the diffuser structure and the prism structure, reducing displacement between the diffuser structure and the prism structure, ensuring yield of the optical component, thereby ensuring display performance of electronic equipment provided with the optical component herein.

The method may further include a step as follow. A supporting layer that covers the exit surface from above may be formed. A top of the supporting layer may be parallel to the underside. After forming the supporting layer, the optical board may be flipped. A reflective coating may be formed on the underside of the optical board that has been flipped. After forming the reflective coating, the supporting layer may be removed.

During production, an optical board may have to be placed on a bearing table before being processed. When a reflective coating is formed on an underside of the optical board that has been flipped, if the exit surface is in direct contact with the bearing table, a delicate structure included in the exit surface such as the prism structure may be damaged, reducing yield of a manufactured optical component.

A supporting layer covers the exit surface from above. When a reflective coating is being formed on the optical board that has been flipped, the supporting layer is in direct contact with the bearing table. On one hand, the supporting layer may protect the exit surface when the reflective coating is being formed, reducing damage to the exit surface of the optical component. On the other hand, since a top of the supporting layer is parallel to the underside of the light guide board, the supporting layer may provide a flat surface in contact with the bearing table, ensuring quality of the formed reflective coating.

The supporting layer that covers the exit surface from above may be formed as follows. The supporting layer is formed atop the prism structure. When no diffuser structure is formed on the prism structure of the optical component, the supporting layer covering the prism structure may be formed. Then, the optical board may be flipped. The reflective coating may be formed on the underside of the optical board that has been flipped.

In a subsequent process, no diffuser structure may be formed atop the prism structure in the optical component. That is, the final optical component may include no diffuser structure.

Alternatively, in a subsequent process, after the reflective coating is formed and the supporting layer is removed, the upper surface of the prism structure may be spattered with scattering particles of different particle sizes, forming a diffuser structure for scattering light. That is, the final optical component may include a diffuser structure.

The supporting layer that covers the exit surface from above may be formed as follows. When the diffuser structure including the scattering particles of different particle sizes is deployed on a surface of the prism structure, the supporting layer may be formed atop the diffuser structure.

In chase a diffuser structure is to be integrated in an optical component, before a reflective coating has been formed, an upper surface of a prism structure may be spattered with scattering particles of different particle sizes, forming the diffuser structure for scattering light. Before the reflective coating has been formed, when the diffuser structure is formed on the upper surface of the prism structure, by forming the supporting layer covering the diffuser structure, the diffuser structure and the prism structure may be better protected while the reflective coating is being manufactured, ensuring quality of the manufactured optical component.

The method may further include a step as follow. Before the supporting layer is removed, a protective layer may be formed on an upper surface of the reflective coating. Exemplarily, the protective layer may be glued to the upper surface of the reflective coating. Understandably, the upper surface of the reflective coating and the lower surface of the reflective coating may be opposite surfaces. The lower surface of the reflective coating may be in contact with the underside of the light guide board.

With embodiments herein, a protective layer is formed on an upper surface of a reflective coating, reducing contact of the reflective coating with the environment. In addition, with the protective layer, a probability that the reflective coating is undermined while a supporting layer is being removed is lowered, ensuring intactness of the reflective coating, thereby ensuring quality of the optical component.

Figure 14:
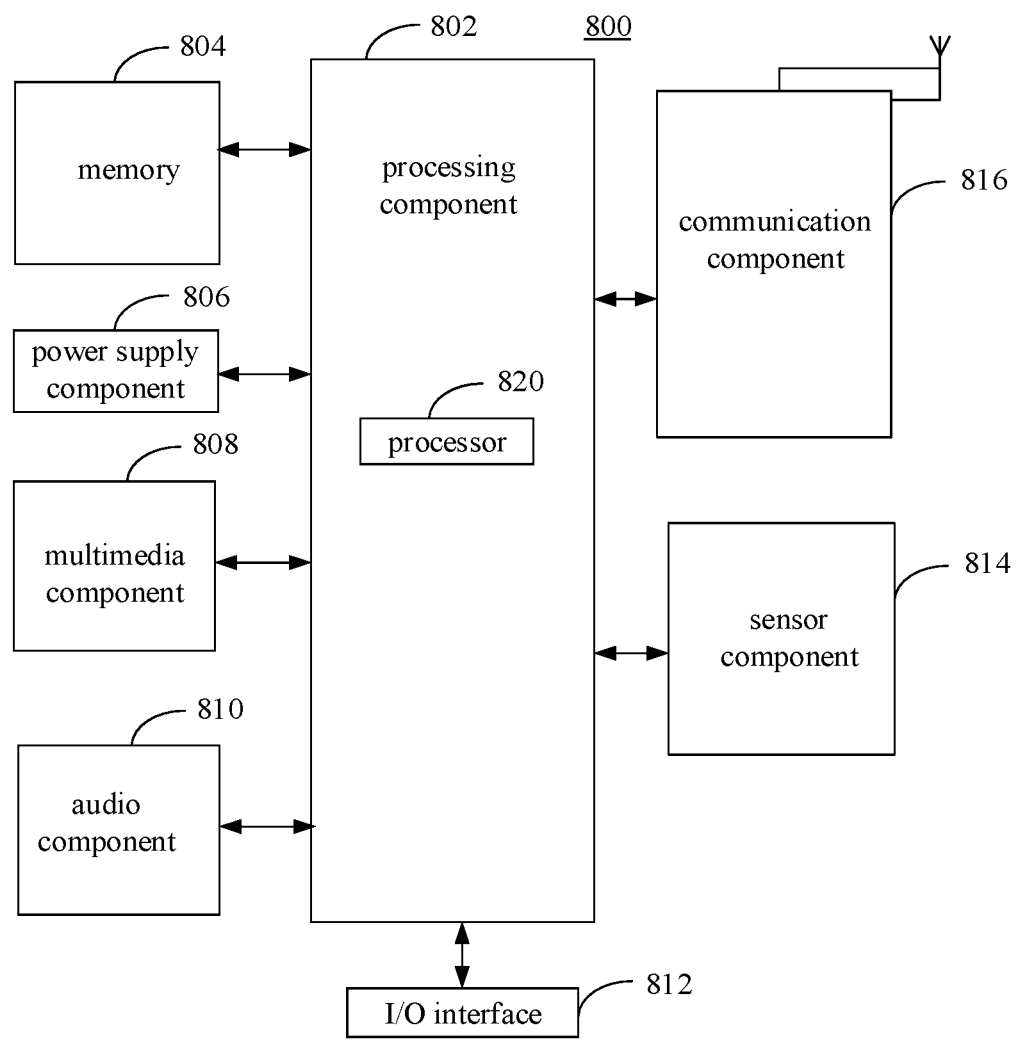
FIG. 14 is a block diagram of a device including an optical component according to an exemplary embodiment.

FIG. 14 is a block diagram of a device 800 including an optical component 100 according to an exemplary embodiment. For example, the device 800 may be UE such as a mobile phone, a computer, digital broadcast UE, messaging equipment, a gaming console, tablet equipment, medical equipment, fitness equipment, a personal digital assistant, and the like.

Referring to FIG. 14, the device 800 may include at least one of a processing component 802, memory 804, a power supply component 806, a multimedia component 808, an audio component 810, an Input/Output (I/O) interface 812, a sensor component 814, a communication component 816, and the like.

The processing component 802 may generally control an overall operation of the device 800, such as operations associated with display, a telephone call, data communication, a camera operation, a recording operation, and the like. The processing component 802 may include one or more processors 820 to execute instructions so as to complete all or part of an aforementioned method. In addition, the processing component 802 may include one or more modules to facilitate interaction between the processing component 802 and other components. For example, the processing component 802 may include a multimedia portion to facilitate interaction between the multimedia component 808 and the processing component 802.

The memory 804 may be adapted to storing various types of data to support the operation at the device 800. Examples of such data may include instructions of any APP or method adapted to operating on the device 800, contact data, phonebook data, messages, pictures, videos, and the like. The memory 804 may be realized by any type of transitory or non-transitory storage equipment or a combination thereof, such as Static Random Access Memory (SRAM), Electrically Erasable Programmable Read-Only Memory (EE-PROM), Erasable Programmable Read-Only Memory (EPROM), Programmable Read-Only Memory (PROM), Read-Only Memory (ROM), magnetic memory, flash memory, a magnetic disk, a compact disk, and the like.

The power supply component 806 may supply electric power to various components of the device 800. The power supply component 806 may include a power management system, one or more power sources, and other components related to generating, managing, and distributing electricity for the device 800.

The multimedia component 808 may include a screen that provides an output interface between the device 800 and a user. The screen may include a Liquid Crystal Display (LCD), a Touch Panel (TP), etc. If the screen may include a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move.

The multimedia component 808 may include at least one of a front camera or a rear camera. When the device 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be adapted to outputting and/or inputting an audio signal. For example, the audio component 810 may include a microphone (MIC). When the device 800 is in an operation mode such as a call mode, a recording mode, a voice recognition mode, and the like, the MIC may be adapted to receiving an external audio signal. The received audio signal may be further stored in the memory 804 or may be sent via the communication component 816. The audio component 810 may further include a loudspeaker adapted to outputting the audio signal.

The I/O interface 812 may provide an interface between the processing component 802 and a peripheral interface portion. Such a peripheral interface portion may be a keypad, a click wheel, a button, and the like. Such a button may include but is not limited to at least one of a homepage button, a volume button, a start button, or a lock button.

The sensor component 814 may include one or more sensors for assessing various states of the device 800. For example, the sensor component 814 may detect an on/off state of the device 800 and relative locationing of components such as the display and the keypad of the device 800. The sensor component 814 may further detect a change in the location of the device 800 or of a component of the device 800, whether there is contact between the device 800 and a user, the orientation or acceleration/deceleration of the device 800, a change in the temperature of the device 800, and the like. The sensor component 814 may include a proximity sensor adapted to detecting existence of a nearby object without physical contact. The sensor component 814 may further include an optical sensor such as a Complementary Metal-Oxide-Semiconductor (CMOS) or a Charge-Coupled-Device (CCD) image sensor used in an imaging APP. The sensor component 814 may further include an acceleration sensor a gyroscope sensor a magnetic sensor a pressure sensor a temperature sensor and the like.

The communication component 816 may be adapted to facilitating wired or wireless communication between the device 800 and other equipment. The device 800 may access a wireless network based on any communication standard, such as Wi-Fi, 2G, 3G . . . , or a combination thereof. The communication component 816 may broadcast related information or receive a broadcast signal from an external broadcast management system via a broadcast channel. The communication component 816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), and the like.

In an exemplary embodiment, the device 800 may be realized by one or more electronic components such as an APP Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, and the like, to implement the method.

In an exemplary embodiment, a non-transitory computer-readable storage medium including instructions, such as memory 804 including instructions, may be provided. The instructions may be executed by the processor 820 of the device 800 to implement the method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, and the like.

A non-transitory computer-readable storage medium has stored thereon instructions which, when executed by a processor of a device for identifying a gesture, enable the device to implement a method herein.

Further note that herein by "multiple", it may mean two or more. Other quantifiers may have similar meanings. A term "and/or" may describe an association between associated objects, indicating three possible relationships. For example, by A and/or B, it may mean that there may be three cases, namely, existence of but A, existence of both A and B, or existence of but B. A slash mark "/" may generally denote an "or" relationship between two associated objects that come respectively before and after the slash mark. Singulars "a/an", "said" and "the" are intended to include the plural form, unless expressly illustrated otherwise by context.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:
1. An optical component, comprising:
a light guide board having an incident surface, an exit surface, and an underside that is parallel to the exit surface,
wherein the incident surface is connected to the underside and the exit surface, respectively, the exit surface includes a prism structure for refracting light in the light guide board, and the prism structure is integrated onto the exit surface of the light guide board,
wherein the underside further includes a reflective coating for reflecting light that is incident on the underside of the light guide board, and the reflective coating is integrated onto the underside of the light guide board,
wherein the incident surface includes a concave curved surface that is concave toward inside of the light guide board,
wherein the optical component further comprises a diffuser structure for scattering light, the diffuser structure being deployed atop the prism structure and including scattering particles of different particle sizes, the diffuser structure being of transmittance greater than 90%, and
wherein the optical component further comprises a protective layer arranged below the reflective coating, and the protective layer is formed using black material.
2. The optical component of claim 1, wherein the prism structure includes a prism array having multiple triangular prism units.
3. The optical component of claim 2, wherein:
two neighboring rows of triangular prism units in the prism array zigzag along a column direction, or
two neighboring columns of triangular prism units in the prism array zigzag along a row direction.
4. A backlight module, comprising:
the optical component of claim 1; and
a backlight source arranged alongside the incident surface of the optical component.
5. The backlight module of claim 4, further comprising a curved protective cover, wherein:
the backlight source is secured inside the curved protective cover, and
at least the incident surface of the light guide board in the optical component is located in the curved protective cover.
6. Electronic equipment, comprising:
the backlight module of claim 4;
a display module arranged above the backlight module; and
a housing provided with an accommodating space for accommodating the backlight module and the display module.
7. The electronic equipment of claim 6, further comprising a securing structure that is adapted to secure the optical component inside the housing.

* * * * *